United States Patent [19]

Chernikov et al.

[11] Patent Number: 4,684,112

[45] Date of Patent: Aug. 4, 1987

[54] DEVICE FOR MAGNETIC HOLDING OF WORKPIECES

[76] Inventors: Jury L. Chernikov, prospekt Energetikov, 28/6, kv. 70, Leningrad; Bodgan I. Patykivsky, ulitsa Sovetskaya, 70, kv. 79, Drogobych; Vladimir A. Chernovol, ulitsa Severnaya, I2, kv. 2, Vyborg, all of U.S.S.R.

[21] Appl. No.: 915,249
[22] PCT Filed: Jan. 15, 1986
[86] PCT No.: PCT/SU86/00001
§ 371 Date: Sep. 8, 1986
§ 102(e) Date: Sep. 8, 1986
[87] PCT Pub. No.: WO86/04287
PCT Pub. Date: Jul. 31, 1986
[51] Int. Cl.$^4$ .............................................. B25B 11/00
[52] U.S. Cl. ......................................... 269/8; 335/289
[58] Field of Search ..................... 269/8; 335/289, 290

[56] References Cited

U.S. PATENT DOCUMENTS

| 1,232,512 | 7/1917 | Downes et al. | 335/289 |
| 2,882,458 | 4/1959 | Anderson et al. | 335/289 |
| 4,075,589 | 2/1978 | Braillon | 335/289 X |
| 4,090,162 | 5/1978 | Cardone et al. | 335/289 |
| 4,356,467 | 10/1982 | Cardone et al. | 335/289 X |

FOREIGN PATENT DOCUMENTS

| 1576725 | 8/1969 | France . | |
| 150930 | 8/1985 | Japan | 269/8 |
| 186339 | 9/1985 | Japan | 269/8 |
| 593892 | 2/1978 | U.S.S.R. . | |

OTHER PUBLICATIONS

Walker-Hagou. BV (advertising prospectus), "Magnetic Products", May 1983.
O. Ya. Konstantinov, "Magnitnaya Tekhnologicheskaya Osnastka", 1974, Mashinostroenie Publ. (Leningrad), see pp. 159, 160.
O. Ya. Konstantinov, "Raschet i. konstruirovanie magnitnykh i elektromagnitnykh prisposobleny", 1967, Mashinostroenie Publ. (Leningrad), see pp. 52-53.

Primary Examiner—Frederick R. Schmidt
Assistant Examiner—Steven P. Schad
Attorney, Agent, or Firm—Lilling & Greenspan

[57] ABSTRACT

A device comprising a plate (1) for holding workpieces (11) when handled on a machine tool, and a magnetic field excitation unit which is made in the form of at least one magnetic core (3) mounted on a base (2). A bottom portion (4) of each of the cores (3) is encompassed by a direct-current coil winding (6) and is thickened so as to form, together with the top portions (5), a step for the plate (1) to rest upon. The top portion (5) is accommodated in the interior of the plate (1) and is magnetically insulated therefrom with the aid of elements (7) made of a nonmagnetic material. The area of contact of the plate (1) with the core (3) does not exceed the cross-sectional area of the plate (1) confined within the perimeter of the step of the core (3), while a distance ($\tau$) between the axes of the cores (3) is determined by the following relationship:

$$\tau = \frac{1.6 \cdot 10^3 \cdot B \cdot h}{\sqrt{P_o}} + b,$$

where
B is the magnetic induction corresponding to the magnetic saturation of the material of the plate (1);
h is the thickness of the plate (1);
$P_o$ is the specific attraction force applied to the workpiece (11);
b is the thickness of the bottom portions (4) of the cores (3).

2 Claims, 10 Drawing Figures

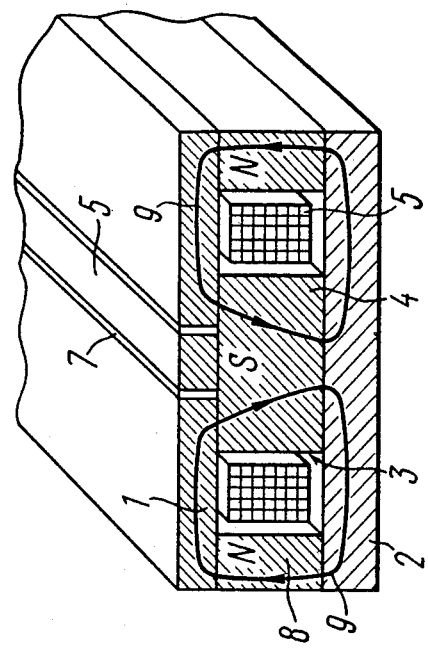
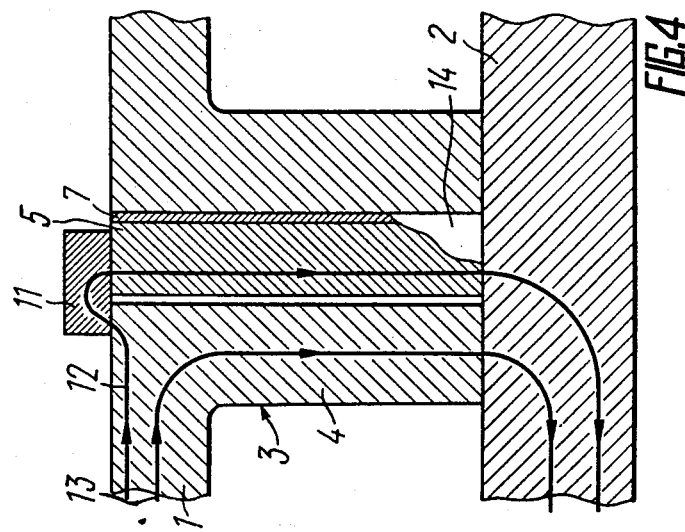
FIG.5
FIG.4

DEVICE FOR MAGNETIC HOLDING OF WORKPIECES

TECHNICAL FIELD

The present invention relates to machine-tool attachments and accessories and has particular reference to devices for magnetic holding of workpieces.

BACKGROUND ART

Known in the present state of art are devices for magnetic holding of workpieces (cf. an advertising prospectus of Walker-Hagou. BV, EFE 05/83 Alterations reserved, or a textbook "Magnetic and electromagnetic jigs and fixtures in machining practice" by A. Ya. Vernikov. Moscow, Mashinostroenie Publishers, 1984, p. 56, Table 9, Para. 1,3), comprising a workpiece holding plate and a magnetic field excitation unit which incorporates magnetic cores of a soft magnetic material, mounted on a base, said cores being encompassed by direct-current coil windings and thus establishing the main poles of a magnetic system. The workpiece-holding plate is in fact a sectionalized structure made up of steel bars situated above the main poles of the magnetic system, and placed therebetween steel plates interspersed alternatively with nonmagnetic material plates.

Such a constructional arrangement of the device makes it possible to hold both large- and relatively small-sized workpieces, a feature giving the device an important advantage and providing technological versatility of the device.

However, the aforementioned composite plate is too complicated in manufacture. In addition, the plate is subject to mechanical strain and thermal effect which cause dissimilar deformation of the inhomogeneous elements making up the plate. This, in turn, leads to lost geometrical trueness and formation of microcracks which affects adversely workpiece locating accuracy and quality of machining, as well as operating reliability of the device due to possible loss of tightness of the plate.

One prior-art device for magnetic holding of workpieces (cf. an advertising prospectus of Walker-Hagou. BV for a symposium on magnetic holding appliance, Odessa, 1983, p. 10–11, FIG. 10, or a textbook "Magnetic and electromagnetic jigs and fixtures in machining practice" by A. Ya. Vernikov. Moscow, Mashinostroenie Publishers, 1984, p. 50, Table 7, Para. 1) is known to comprise a workpiece holding plate and a magnetic field excitation unit which incorporates base-mounted magnetic cores whose bottom portions are enveloped by coil windings, while their top portions or extensions thereof are located in the plate interior and are magnetically insulated from the plate with elements made of a nonmagnetic material. The plate is an all-metal structure except for those portions that accommodate the top portions of the excitation unit magnetic cores.

The fact that the top portions of the magnetic cores are located in the interior of the workpiece-holding plate makes possible for magnetic flux to flow to the workpiece being held along the shortest possible pathway and hence for attaining grater attraction forces applied to the workpiece involved.

However, all stated above holds true only for comparatively large-sized workpieces which cover at least two poles of the magnetic system. Smaller workpieces are held rather poorly on this device, whereas workpieces having a size substantially lower than the interpole distance cannot be held altogether. To provide a possibility of holding such workpieces, the interpole distance is to be reduced, which results in an increased number of magnetic cores and coils, drastically sophisticates the construction and affects adversely the reliability of the device. At the same time inhomogeneity of the plate is increased due to a closely spaced network of nonmagnetic elements, which degrades the workpiece locating and machining accuracy. Such a device is also fraught with a danger of the plate getting untight at the places where the nonmagnetic elements are located and hence of the coolant to penetrate to the coil windings.

DISCLOSURE OF THE INVENTION

The principal object of the present invention is to provide a device for magnetic holding of workpieces, wherein the construction arrangement of the magnetic field excitation unit would be capable of holding workpieces within a wide range of sizes, ensure high locating and machining accuracy, high operating reliability and involve comparatively simple construction and production process techniques.

Said object is accomplished due to the fact that in a device for magnetic holding of workpieces, comprising a workpiece setting plate and a magnetic field excitation unit made as at least one base-mounted magnetic core whose bottom portion is encompassed by a direct-current coil winding, while its top portion is located in the plate interior and is magnetically insulated from the plate with the aid of elements made of a nonmagnetic material, according to the invention, the core bottom portion is thickened so as to form a step or flange with the top portion thereof for the plate to rest upon, the plate-to-core contact area not exceeding the plate cross-sectional area confined within the perimeter of the core step, while the interaxial spacing of the cores is determined by the following relationship:

$$\tau = \frac{1.6 \cdot 10^3 \cdot B \cdot h}{\sqrt{P_o}} + b \qquad (1)$$

where $\tau$ is the interaxial spacing of the cores;

B is the magnetic saturation flux density of the material the plate is made of;

h is the plate thickness;

b is the thickness of the bottom core portion;

$P_o$ is the specific attraction force applied to the workpiece held.

A uniform attraction force of workpieces over the plate within the zone of the core top portion may be obtained when the top core portion is trapezoid shaped.

The device for magnetic holding of workpieces made according to the present invention, though of a comparatively simple construction, is reliable in operation, makes it possible to hold workpieces within a wide range of sizes and with a required force and provides for high workpiece machining accuracy.

BRIEF DESCRIPTION OF THE DRAWINGS

In what follows the present invention will now be disclosed in a detailed description of an illustrative embodiment thereof with reference to the accompanying drawings, wherein:

FIG. 4 is a view of one more embodiment of the plate-core unit, according to the invention;

FIG. 5 is a view of an embodiment of the device incorporating a single magnetic core, according to the invention;

BEST MODE OF CARRYING OUT THE INVENTION

Figure 1:
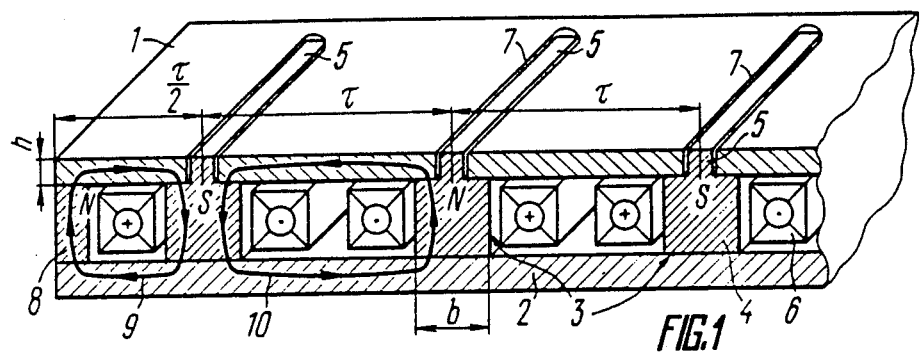
FIG. 1 is a longitudinal sectional perspective view of a device for magnetic holding of workpieces, according to the invention.

The device for magnetic holding of workpieces handled in a machine tool comprises a plate 1 (FIG. 1) for holding workpieces being machined and a magnetic field excitation unit made as magnetic cores 3 mounted on a base 2. A bottom portion 4 of each core 3 is made thickened so as to form, together with a top portion 5, a step contacting the plate 1, and is encompassed by a direct-current coil winding 6. The top portions 5 of the cores are accommodated in the interior of the plate 1 and insulated therefrom with elements 7 made of a nonmagnetic material. The plate 1, the base 2, the cores 3 and outside walls 8 establishing the casing of the device and closing the magnetic circuit, are made of a soft magnetic material. Depending on the size of the device it may comprise a different number of the cores 3.

Arrowheaded lines 9 and 10 represent the paths of magnetic fluxes when no workpieces are held on the plate 1. The coils 6 are so interconnected that the N and S polarities of the cores 3 alternate. The following conventional symbols are present in FIG. 1:

h—for the plate thickness;

$\tau$—for the interaxial spacing of the cores 3 hereinafter referred to as interpole distance;

b—for the thickness of the bottom portion 4 of the core 3.

Figure 2:
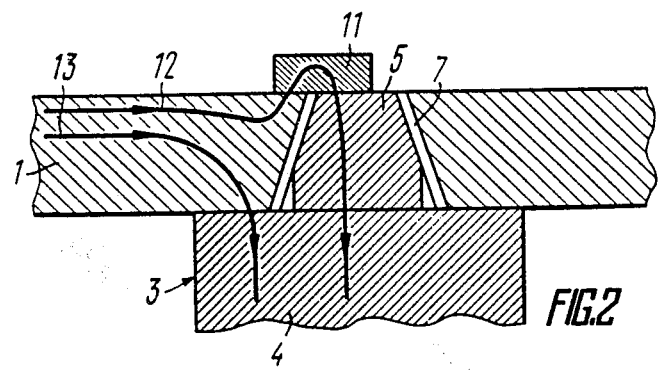
FIG. 2 is a view of an alternative embodiment of the plate-core unit, according to the invention.

To provide a uniform force for a workpiece 11 (FIG. 2) to hold to the plate 1 within the zone of the top portions 5 of the cores 3, it is expedient that the top portions 5 of the cores be trapezoidal-shaped. Arrowheaded lines 12 and 13 indicate possible magnetic flux paths when the workpiece 11 is set on the plate 1 so as to cover the nonmagnetic element 7.

Figure 3:
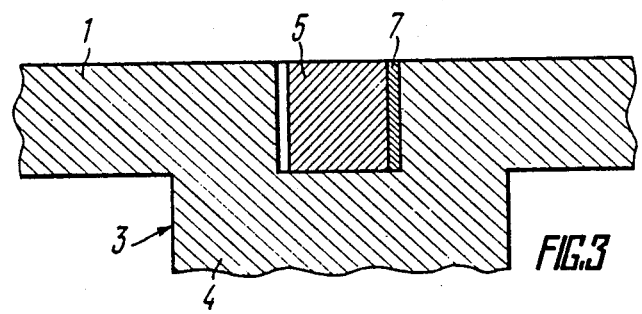
FIG. 3 is a view of another embodiment of the plate-core unit, according to the invention.

The bottom portions 4 (FIGS. 2, 3, 4,) of the cores 3 may be made integral with the plate 1, while the top portions 5 of the cores 3 may be diversely shaped.

FIG. 4 illustrates an embodiment of the device, wherein the bottom portion 4 of the core 3 has a through longitudinal slot 14 to accommodate an insert made integral with the top portion 5 of the core 3 and adapted to contact the base 2.

FIG. 5 depicts an embodiment of the device provided with only one core 3.

Any of the embodiments of the device should meet the condition that the contact area of the bottom portion 4 of each core 3 with the plate 1 should not exceed the cross-sectional area of the plate 1 confined within the perimeter of the step of the core 3. The condition of that relation is explained in FIG. 6, wherein the shaded areas correspond to the contact area of the bottom portion 4 of the core 3 with the plate 1, while unshaded section confined between the shaded ones corresponds to the trace of the top portion 5 of the core 3, which is omitted in FIG. 6 for simplicity. The essence of the condition in question resides in that the area of the shaded sections should not exceed the sum of the areas of rectangles 15, 16, 17, 18 through which magnetic flux emerging from the plate 1, passes to the bottom portion 4 of the core 3. It is obvious that the height of said rectangles 15, 16, 17, 18 is equal to the thickness h of the plate 1, while their total length equals the perimeter of the step of the core 3.

The physical measning of the aforesaid condition needs consideration of the functioning of the device and is disclosed hereinbelow.

The device, according to the invention, should also meet the condition that a distance $\tau$ (FIG. 1) between the axes of the cores 3 that is, the interpole distance, is determined by the following relationship:

$$\tau = \frac{1.6 \cdot 10^3 \cdot B \cdot h}{\sqrt{P_o}} + b, \qquad (1)$$

where

B is the magnetic induction corresponding to the magnetic saturation of the material of the plate 1;

h is the thickness of the plate 1;

$P_o$ is the specific attraction force applied to the workpieces 11;

b is the thickness of the bottom portion 4 of the core 3.

Such a value of the interpole distance $\tau$ is the optimum one for the present device from the standpoint of simplicity of its construction, provision of uniform attraction forces with which the workpieces 11 are held to the plate 1 and versatility of the device, which will be substantiated more detailed in the description of the operation of the device that follows hereinbelow.

In the embodiment of the device, incorporating only one core 3 (as illustrated in FIG. 5), the function of the opposite pole of the magnetic circuit is performed by the walls 8 of the casing, therefore the distance between the axes of the poles N and S is equal to $\tau/2$, while the total interpole distance $\tau$ depends on the width of the device. When the width of the device exceeds the interpole distance $\tau$ as determined from the aforementioned relationship, this is indicative of a necessity for introducing the other core 3.

Figure 7:
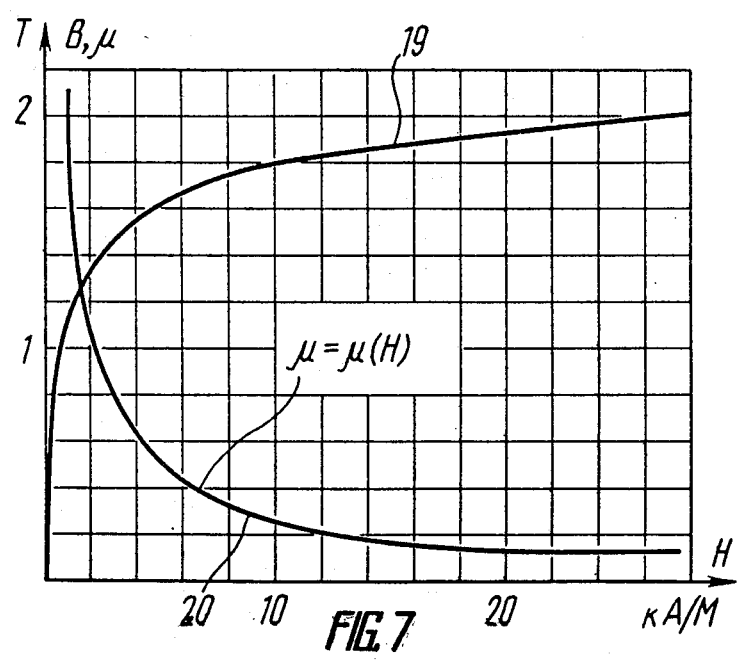
FIG. 7 illustrates characteristic curves representative of magnetic properties inherent in the material of the plate, according to the invention.

FIG. 7 represents a curve 19 of magnetic induction B versus magnetic field intensity H in the material of the plate 1, i.e., steel, while a curve 20 represents magnetic permeability $\mu$ versus magnetic field intensity H.

Figure 8:
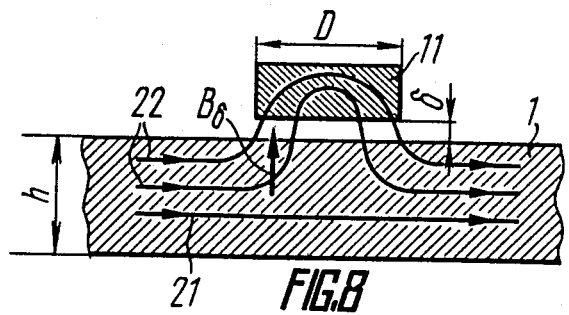
FIG. 8 is a view of a plate portion, on which the workpiece is held, according to the invention.

When the workpiece 11 having a diameter D (FIG. 8) is held to the solid section of the plate 1, a line 21 represents that portion of the magnetic flux which passes over the plate 1, while lines 22 indicate the part of the magnetic flux that is branched to the workpiece 11 through a nonmagnetic gap $\delta$ with the magnetic induction of $B_\delta$.

The magnetic induction B (FIG. 9) corresponds to the saturation induction of the material from which the plate 1 is made.

Figure 10:
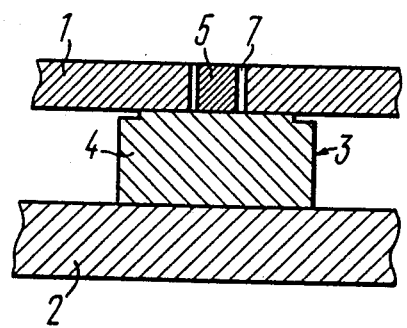
FIG. 10 is a view of core-plate-base unit, according to the invention.

The thickness of the bottom portions 4 of the cores 3 may be increased whenever necessary, with the area of the bearing surface remaining unaffected as shown in FIG. 10.

The operation of the device is based on the use of the effect of magnetic saturation of the soft magnetic material of the plate 1 (FIG. 1), which takes place when the magnetic field intensity reaches a certain value, said field being excited in the magnetic circuit of the device in response to a direct current flowing along the coil windings 6, i.e., when the windings are connected to a source of a direct-current voltage. When the coils 6 are connected according to a pattern providing unlike polarity of the adjacent cores 3 in the device, e.g., as it is indicated with cross-marks and dots on the coils 6 of FIG. 1 showing the direction of current flow in the coils 6, magnetic fluxes arise in the magnetic circuit of the device within the limits of each interpole distance, said fluxes being closed in the cores 3, the plate 1 and the base 2. The lines 9, 10 represent the paths of said fluxes when no workpieces 11 are set on the plate 1 (FIGS. 1, 5), If the magnetic resistance of the cores 3 and the base 2 is too low as compared with that of the plate 1, the greater proportion of the magnetomotive force of each of the coils 6 is applied to a section of the plate 1 having a length equal to the interpole distance $\tau$, thus establishing a comparatively high magnetic filled intensity therein. In this case it is obviously expedient that as low part of the magnetomotive force F of the coils 6 as possible be consumed for conducting the magnetic flux over the nonactive portions of the magnetic circuit, i.e., the cores 3 and the base 2. This is easily attainable due to increased thickness values of the cores 3 and the base 2 as compared with the thickness h of the plate 1. Quite attainable is such a condition of the magnetic circuit of the device that features nearly total magnetomotive force of the coils 6 applied to the respective portions of the plate 1. Such being the case, the magnetic field intensity H for a portion of the plate 1 corresponding to the interpole distance $\tau$ (FIG. 1) will be determined through the magnetomotive force F of each of the coils 6:

$$H = F/\tau \qquad (2)$$

It is with a definite value of the magnetic field intensity H in the plate 1 that its magnetic saturation occurs, characterized by a drastic retardation of the magnetic flux rise and hence of the magnetic induction B (FIG. 7). This commonly known process is described by the saturation curve 19 for structural steel as represented in FIG. 7. The same Figure illustrates the $\mu = \mu(H)$ curve, where $\mu$ is the magnetic permeability of steel which badly reduces as the magnetic field intensity H rises. It is the magnetic resistance of the plate 1 which is liable to sharply rise with saturation that is the reciprocal of the magnetic permeability, while an increase in the magnetic resistance of the plate 1 in the direction of the line 21 representing the magnetic flux path is an immediate cause of branching of the magnetic flux along the lines 22 to the workpiece 11 (FIG. 8) set on the plate 1 and magneting holding of said workpiece thereon. In this case the magnetic attraction force depends on the average induction $B_\delta$ of a a part of the magnetic flux that branches through the nonmagnetic gap $\delta$ between the plate 1 and the workpiece 11, along the lines 22.

The amount of the gap $\delta$ depends on the quality of bearing surfaces of the plate 1 and the workpiece 11 and falls as a rule within 0.01 and 0.1 mm. As can be seen from FIG. 8, branching of the magnetic flux along the lines 22 to the workpiece 11 will occur only when the magnetic resistance of the magnetic flux path through the two gaps $\delta$ and the workpiece 11 will be less than that of the magnetic plate 1 on its section corresponding to the diameter D of the workpiece 11. It ensues from the curve 20 represented in FIG. 7 that with an adequately high value of the magnetic field intensity H in the plate 1 (FIG. 1) the magnetic permeability of the material of the plate 1 is reduced by several scores of times. Magnetic resistance of the plate 1 rises accordingly, which makes it possible to select such a degree of magnetic saturation of the plate 1 that would ensure magnetic holding of the workpieces 11 with a required attraction force.

An important property of the device with the magnetically saturated plate 1 for holding the workpieces 11 is the ability of the plate 1 to hold the workpieces 11 of any size. Depending on its diameter D the workpiece 11 itself establishes a new polar division so that the interpole distance is equal to the diameter D (FIG. 8) of the workpiece 11 and may be several times as short as the interpole distance $\tau$ between the axes of the cores 3. Thus, the plate 1 has the polar division self-adaptable, as it were, to the size of the workpiece 11. In this case the interpole distance $\tau$ depending on the spacing between the axes of the cores 3 (FIG. 1), is characteristic of the ability of the device to hold the large-sized workpieces 11 that cover at least two cores 3, while the polar divisions formed by the small-sized workpieces 11, are characteristic of the ability of the device to hold the small-sized workpieces 11 to the sections of the plate 1 between the cores 3. One may say therefore that the device of the invention makes use of the two principles of holding the workpieces 11. The basic principle pertaining to the major part of the holding surface of the plate 1, proceeds from the use of the property of ferromagnetic materials to sharply increase their magnetic resistance after having been magnetically saturated. Another principle consists in a traditional dividing of the device into polar sections, depending on the distance between the poles N and S.

Figure 9:
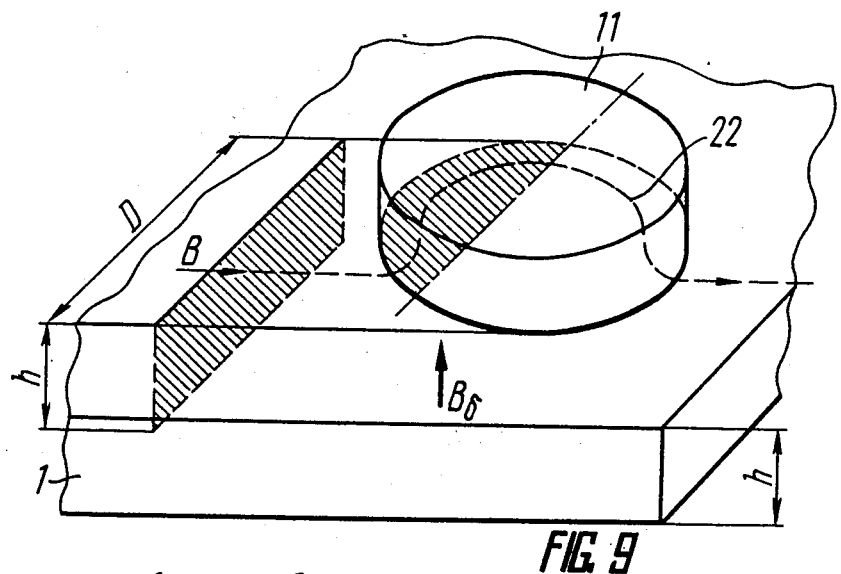
FIG. 9 is a perspective view of FIG. 8, according to the invention.

Selection of the interpole distance $\tau$ from the expression (1) provides for a continuous transition from one method of holding the workpieces 11 to the other while changing over from the small-sized workpieces 11 to the large-sized ones, that is, renders the device versatile. The point of such a coordination is concerned with the fact that there are some physical restrictions imposed upon the magnetically saturated plate 1 as for holding the large-sized workpieces 11. Forasmuch as the magnetic flux flowing along the lines 22 (FIGS. 8, 9) penetrates into the workpiece 11 from the plate 1, so in the case of a very large workpiece 11 the magnetic flux flowing over the plate 1 would be insufficient for the workpiece 11 to hold with a required attraction force. Hence, the maximum diameter of the workpiece 11 must be coordinated with the thickness h of the plate 1. A diagrammatic representation of the solution of the aforesaid problem is illustrated in FIG. 9. The magnetic flux flowing through the plate 1 is featured by the value of the induction B corresponding to the saturation induction of the material of the plate 1, which is a known value.

The process of magnetic holding of the workpiece 11 depends on the branching of the magnetic flux along the line 22 to the workpiece 11 in such a manner that the flux enters the one half of the bearing surface (shaded in FIG. 9) of the workpiece 11 and emerges from the other half thereof. In this case the magnetic induction $B_\delta$ is in fact an average induction in the gap $\delta$ between the plate 1 and the workpiece 11, whose value can be found in terms of a required attraction force with due account of the known Maxwell's formula:

$$P_o = B_\delta^2 / 2\mu_o, \quad (3)$$

where $\mu_o = 4\pi \cdot 10^{-7}$ is the magnetic constant.

It ensues from Eqn (3);

$$B_\delta = \sqrt{2\mu_o P_o}. \quad (4)$$

In order to determine the maximum diameter $D_{max}$ of the workpiece 11 that may be held with a required attraction force to the plate 1 having the thickness of h, proceeding from the data of FIG. 9, one may apply the following equation:

$$B \cdot h \cdot D_{max} = \frac{\pi \cdot D^2_{max}}{8} \cdot B\delta \quad (5)$$

The left side of the equation represents the magnetic flux flowing through the shaded area of the plate 1, while the right side of the equation represents the magnetic flux entering the half of the bearing surface of the workpiece 11.

It follows from Eqn (5):

$$D_{max} = \frac{8 \cdot B \cdot h}{\pi \cdot \sqrt{2\mu_o P_o}} \quad (6)$$

The largest possible workpiece 11 that still should be held by virtue of the magnetic saturation of the plate 1, has a diameter equal to $\tau - b$ (FIG. 1). The larger workpieces 11 will be held by the magnetic flux that flows through them along the shortest path through the cores 3.

Now substituting the value of $D_{max} = \tau - b$ into Eqn (6) one obtains the following expression for the interpole distance $\tau$:

$$\tau = \frac{8 \cdot B \cdot h}{\pi \cdot \sqrt{2\mu_o P_o}} + b \quad (7)$$

Making use of the numerical values of the known quantities and rounding off to an accuracy high enough for engineering calculations, one obtains the following expression:

$$\tau = \frac{1.6 \cdot 10^3 \cdot B \cdot h}{\sqrt{P_o}} + b, \quad (8)$$

which agrees with the expression (1).

Thus, selection of the interpole distance from the expression (1) provides for magnetic holding of both small-sized and any large-sized workpieces 11, since the expression has been obtained stemming from the most unfavourable conditions. When the devices are made of, e.g., steel for which the saturation curve 19 is represented in FIG. 7, the following holds true: B = 1.9T. By specifying the geometrical dimensions as follows: $h = 20 \cdot 10^{-3}$ m, $b = 3h = 60 \cdot 10^3$ m one can obtain the following value of the interpole distance $\tau$ effective for $P_o = 6$ kgf/cm$^2 = 6 \cdot 10^5$ N/m$^2$:

$$\tau = \frac{1.6 \cdot 10^3 \cdot 1.9 \cdot 20 \cdot 10^{-3}}{6 \cdot 10^5} + 60 \cdot 10^{-3} = 138.5 \ \mu m$$

Such a value of the distance $\tau$ is a quite convenient one from the viewpoint of practical realization, since it is relatively large, whereby the number of the cores 3 with the coils 6 may be reduced in the device and the production process expenses for the device are cut down. On the other hand, said distance is not too great to cause an excessively high spread of the magnetic field over the surface of the plate 1 which is undesirable due to a danger of magnetization of the cutting tool and sticking of chips during machining of the workpiece 11. Thus, in spite of the simplified construction the device is more versatile than any of the heretobefore-known similar devices of the same type and is capable of holding both large- and small-sized workpieces 11.

Figure 6:
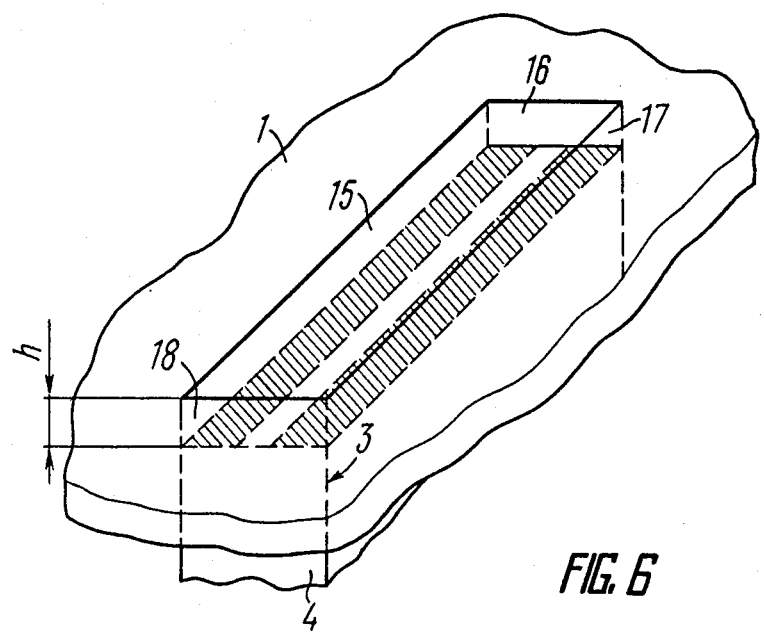
FIG. 6 is a view of a core-to-plate contact unit, according to the invention.

When holding the small-sized workpieces 11 it is necessary to provide an adequate attraction force within the zone of the top portions 5 of the cores 3. For the workpieces 11 to hold in the position shown in FIGS. 2 and 4, it is necessary that the magnetic resistance of the magnetic flux path 12 through the workpiece 11 should be less than the magnetic resistance of the magnetic flux path 13 to the bottom portion 4 of the core 3. This is attained when the contact area of the bottom portion 4 of the core 3 does not exceed the cross-sectional area of the plate 1 confined within the perimeter of the step of the core 3 (FIG. 6). Such being the case, the section when the magnetic flux passes from the plate 1 along the line 13 to the portion 4 of the core 3 (FIGS. 2, 4), operates with an approximately the same saturation as the plate 1. Consequently, its magnetic resistance is rather high, whereby part of the magnetic flux branches off along the line 12 to flow through the workpiece 11 so as to hold it to the plate 1.

In the bottom portion 4 of the core 3 the magnetic flux should be free to flow to the base 2. When the amount of thickening of the bottom portion 4 of the core 3 by a value depending on the thickness of the top portion 5 of the core 3 proves to be insufficient, the bottom portion 4 is to extend beyond the zone of contact with the plate 1 (FIG. 10). In such a case the thickness of the bottom portion 4 of the core 3 should equal the three- or four-fold value of the thickness of the plate 1, with the aforesaid area of contact with the plate 1 remaining unaffected. To this end, the thickened part of the bottom portion 4 of the core 3 should not contact the plate 1, i.e., should be isolated therefrom by a nonmagentic gap as it is shown in FIG. 10.

Thus, the bottom portion 4 of the core 3 features a local reduction at the place of contact with the plate 1, said reduction being attained either due to the establishing the aforesaid gap (FIG. 10) or by the use of the trapezoidal-shaped top portions 5 (FIG. 2) expanding downwards.

All the embodiments of the construction of the device, wherein the bottom portions 4 (FIGS. 3, 4) of the cores 3 are made integral with the plate 1, may be produced by the casting technique, whereby the plate 1, the bottom portions 4 of the cores 3 and the walls 8 of the casing are made as a single piece requiring no additional machining of the interior surfaces. According to such embodiments, absolute moisture-proofness of the plate 1 is provided, since installing the top portions 5 of the cores 3 in the interior of the plate 1 carried out either by virtue of a press fit (FIG. 3) or by wedge-locking (FIG. 2) does not disturb the intactness of the metallic bond between the plate 1 and the bottom portions 4 of the cores 3.

Provision of the trhough slot 14 (FIG. 4) in the bottom portion 4 of the core 3 and accommodation of an insert therein makes it possible to increase the attraction a force applied to the workpiece 11 within the zone of the top portion 5 of the core 3.

Thus, the principal advantage of the device for magnetic holding of workpieces, according to the present invention, resides in its versatility, operating reliability, accuracy and a possibility of substantially reducing the production process cost. The device is capable of holding the workpieces 11 having a diameter from 10 mm and greater, the plate 1 for holding the workpieces 11 in the device is either absolutely moisture-proof or is featured by increased water-tightness, which is accounted for by a possibility of additional tightening of the horizontal contact areas of the cores 3 and the plate 1. At least 90 percent of the area of the plate 1 for holding the workpieces 11 is in fact a homogeneous metallic surface, which is responsible for high locating and machining accuracy of the workpiece 11. High machining accuracy is also attained due to uniformly spread attractinn forces applied to the workpiece 11 over the greater part of the surface area of the plate 1.

Specific advantages of the device are concerned with the use of low-grade structural steels in its production instead of high-quality soft magnetic materials. Comprehensive computations and experimental research made demonstrate that with the attraction forces under 5 kgf/cm$^2$, even iron castings may be used for all the units of the device except for the top portions 5 of the cores 3 and the base 2. In this case the construction of the device is made up of only four units, i.e., the plate 1 cast integral with the cores 3, the coils 6, the top portions 5 of the cores 3 and the base 2. Such a constructional arrangement reduces the production expenses several times. It is important to point out that application of low-grade steels or even cast iron involves no increase in the consumption of armature copper. Application of high-quality magnetic materials is indispensable only in the devices for heavy-duty machining, e.g. for milling, shaping or planing machines, where the attraction forces of the order of 8 kgf/cm$^2$ and over are required.

INDUSTRIAL APPLICABILITY

The proposed invention can find successful application for holding workpieces made of ferromagnetic materials when machined on grinders, millers, or other machine tools. The device is also applicable as a grip in materials- handling equipment, industrial manipulators and robots.

We claim:

1. A device for magnetic holding of workpieces (11) when handled on machine-tools, comprising a plate (1) for holding the workpieces (11) thereon, and a magnetic field excitation unit in the form of at least one core (3) placed on a base (2), a bottom portion (4) of said core being encompassed by a direct-current coil winding (6), while a top portion (5) of said core is accommodated in the interior of the plate (1) and it magnetically insulated therefrom with the aid of elements (7) made of a non-magnetic material, characterized in that the bottom portion (4) of the core (3) is thickened so as to form, together with the top portion (5), a step in contact with the plate (1), the area of contact of the plate (1) with the core (3) not exceeding the cross-sectional area of the plate (1) as confined within the perimeter of the step of the core (3), and the distance ($\tau$) between the axes of the cores (3) is determined by the following relationship:

$$\tau = \frac{1.6 \cdot 10^3 \cdot B \cdot h}{\sqrt{P_o}} + b,$$

where
B is the magnetic induction corresponding to the magnetic saturation of the material of the plate (1);
h is the thickness of the plate (1);
$P_o$ is the specific attraction force applied to the workpiece (11);
b is the thickness of the bottom portions (4) of the cores (3).

2. A device as claimed in claim 1, characterized in that the top portions (5) of the cores (3) are trapezoidal in shape.

* * * * *